(12) United States Patent
Long et al.

(10) Patent No.: US 10,596,702 B2
(45) Date of Patent: Mar. 24, 2020

(54) RECONFIGURABLE MOBILE CABLE ROBOT

(71) Applicant: INSTITUT DE RECHERCHE TECHNOLOGIQUE JULES VERNE, Bouguenais (FR)

(72) Inventors: Philip Long, Nantes (FR); David Marques-Gamez, Rezé (FR); Stéphane Caro, Nantes (FR); Alexis Girin, Treillieres (FR); Lorenzo Gagliardini, Bouguenais (FR); Marc Goutefarde, Montpellier (FR)

(73) Assignee: INSTITUT DE RECHERCHE TECHNOLOGIQUE JULES VERNE, Bouguenais (FR)

( * ) Notice: Subject to any disclaimer, the term of this patent is extended or adjusted under 35 U.S.C. 154(b) by 516 days.

(21) Appl. No.: 15/391,836

(22) Filed: Dec. 27, 2016

(65) Prior Publication Data

US 2018/0178397 A1    Jun. 28, 2018

(51) Int. Cl.
*B25J 9/16* (2006.01)
*B25J 9/00* (2006.01)
(Continued)

(52) U.S. Cl.
CPC .............. *B25J 9/1666* (2013.01); *B25J 5/00* (2013.01); *B25J 9/0078* (2013.01);
(Continued)

(58) Field of Classification Search
CPC ........ B25J 9/1666; B25J 11/0075; B25J 5/00; B25J 9/0078; G05B 2219/39082; G05B 2219/39109
See application file for complete search history.

(56) References Cited

U.S. PATENT DOCUMENTS

2014/0331808 A1    11/2014  Reid

FOREIGN PATENT DOCUMENTS

GB           2495958 A       5/2013

OTHER PUBLICATIONS

Ramadour et al. "Computing safe trajectories for an assistive cable-driven parallel robot by selecting the cables under tension . . . " 2014 IEEE/ASME International Conference on AIM, France, pp. 1349-1354 [retrieved on Apr. 20, 2019]. Retrieved from <https://ieeexplore.ieee.org/document/6878270/> (Year: 2014).*

(Continued)

*Primary Examiner* — Rehana Perveen
*Assistant Examiner* — Alfred H B Wechselberger
(74) *Attorney, Agent, or Firm* — Im IP Law; Chai Im; C. Andrew Im

(57) ABSTRACT

A cable robot comprises a platform supporting an effector and cables. Each cable is connected on one end to an attachment point on the platform and extends from this attachment point to an anchoring point attached to a supporting structure. The anchoring points being contained in more than one plane. The cables include a set of driving cables whose ends are connected to a winch. The cables include a set of reconfigurable cables, whose anchoring points are movable relative to the supporting structure. The supporting structure is beared by a set of independent mobile bases having anchorings to fix the mobile bases to the ground.

7 Claims, 4 Drawing Sheets

(51) Int. Cl.
   *B25J 11/00* (2006.01)
   *B25J 5/00* (2006.01)
(52) U.S. Cl.
   CPC . *B25J 11/0075* (2013.01); *G05B 2219/39082* (2013.01); *G05B 2219/39109* (2013.01)

(56) References Cited

OTHER PUBLICATIONS

Oh et al. "Cable Suspended Planar Robots With Redundant Cables: Controllers With Positive Tensions" IEEE Transactions on Robotics, vol. 21, No. 3, pp. 457-465 [retrieved on Apr. 18, 2019]. Retrieved from <https://ieeexplore.ieee.org/document/1435490/> (Year: 2005).*

Alba-Gomez, et al. "Trajectory Planning of Parallel Manipulators for Global Performance Optim." J. Lenarcic and P. Wenger (eds.), Advances in Robot Kinematics: Analysis and Design, pp. 253-261 [retrieved on Apr. 21, 2019]. Retrieved from <https://link.springer.com/chapter/10.1007/978-1-4020-8600-7_27> (Year: 2008).*

Gagliardini et al. "Discrete reconfiguration planning for Cable-Driven Parallel Robots" Mechanism and Machine Theory, vol. 100, pp. 313-337 [retrieved on Apr. 21, 2019]. Retrieved from <https://www.sciencedirect.com/science/article/pii/S0094114X16000513> (Year: 2016).*

Niemann et al. "Reducing the Optimization Problem for the Efficient Motion Planning of Kinematically Redundant Parallel Robots" 2013 IEEE/ASME International Conference on AIM, Australia, pp. 618-624 [retrieved on Apr. 20, 2019]. Retrieved from <https://ieeexplore.ieee.org/document/6584161> (Year: 2013).*

Kotlarski et al. "Optimization strategies for additional actuators of kinematically redundant parallel kinematic machines" 2010 IEEE International Conference on Robotics and Automation, Alaska [retrieved on Apr. 21, 2019]. Retrieved from <https://ieeexplore.ieee.org/document/5509982> (Year: 2010).*

Merlet, J. "Parallel Robots" [2nd edition] Gladwell, G. (editor), Solid Mechanics and its Applications, vol. 128, pp. 246-251 [retrieved on Apr. 21, 2019]. Retrieved from <http://www.profesaulosuna.com/data/files/ROBOTICA/ROBOTICS%20EBOOKS/Parallel%20Robots%20-%20Second%20Edition.pdf> (Year: 2006).*

Zi et al. "Localization, obstacle avoidance planning and control of a cooperative cable parallel robot . . . " Robotics and Computer-Integrated Manufacturing, vol. 34, pp. 105-123 [retrieved on Apr. 21, 2019]. Retrieved from <https://www.sciencedirect.com/science/article/pii/S0736584514001033> (Year: 2015).*

Gagliardini et al. "A Reconfiguration Strategy for Reconfigurable Cable-Driven Parallel Robots" 2015 IEEE International Conference on Robotics and Automation, Seattle, pp. 1613-1620 [retrieved on Apr. 18. 2019]. Retrieved from <https://ieeexplore.ieee.org/document/7139404> (Year: 2015).*

Hu et al. "Reconfiguration Planning for Wheel-Manipulator Robots" 5th Annual IEEE International Conference on Cyber Technology in Automation, Control and Intelligent Systems, China [retrieved on Apr. 21, 2019]. Retrieved from <https://ieeexplore.ieee.org/document/7287995/> (Year: 2015).*

Bosscher et al. "A Concept for Rapidly-Deployable Cable Robot Search and Rescue Systems" DETC2005-84324, Proceedings of IDET/CIE 2005, California [retrieved on Apr. 26, 2019]. Retrieved from <https://www.ohio.edu/mechanical-faculty/williams/html/PDF/Mech05.pdf> (Year: 2005).*

Nguyen et al. "On the Analysis of Large-Dimension Reconfigurable Suspended Cable-Driven Parallel Robots" 2014 IEEE International Conference on Robotics and Automation, Hong Kong [retrieved on Apr. 19, 2019]. Retrieved from <https://ieeexplore.ieee.org/document/6907701> (Year: 2014).*

Cunningham et al. "Continuous Path Tracing by a Cable-Suspended, Under-Actuated Robot: The Winch-Bot" 2010 IEEE International Conference on Robotics and Automation, Anchorage, Alaska [retrieved on Oct. 27, 2019]. Retrieved from <http://ieeexplore.ieee.org/document/5509358/> (Year: 2010).*

Rosati et al., "On the Design of Adaptive Cable-Driven Systems," J. Mechanisms and Robotics, May 2011, pp. 021004-1 to 021004-13, vol. 3, ASME.

* cited by examiner

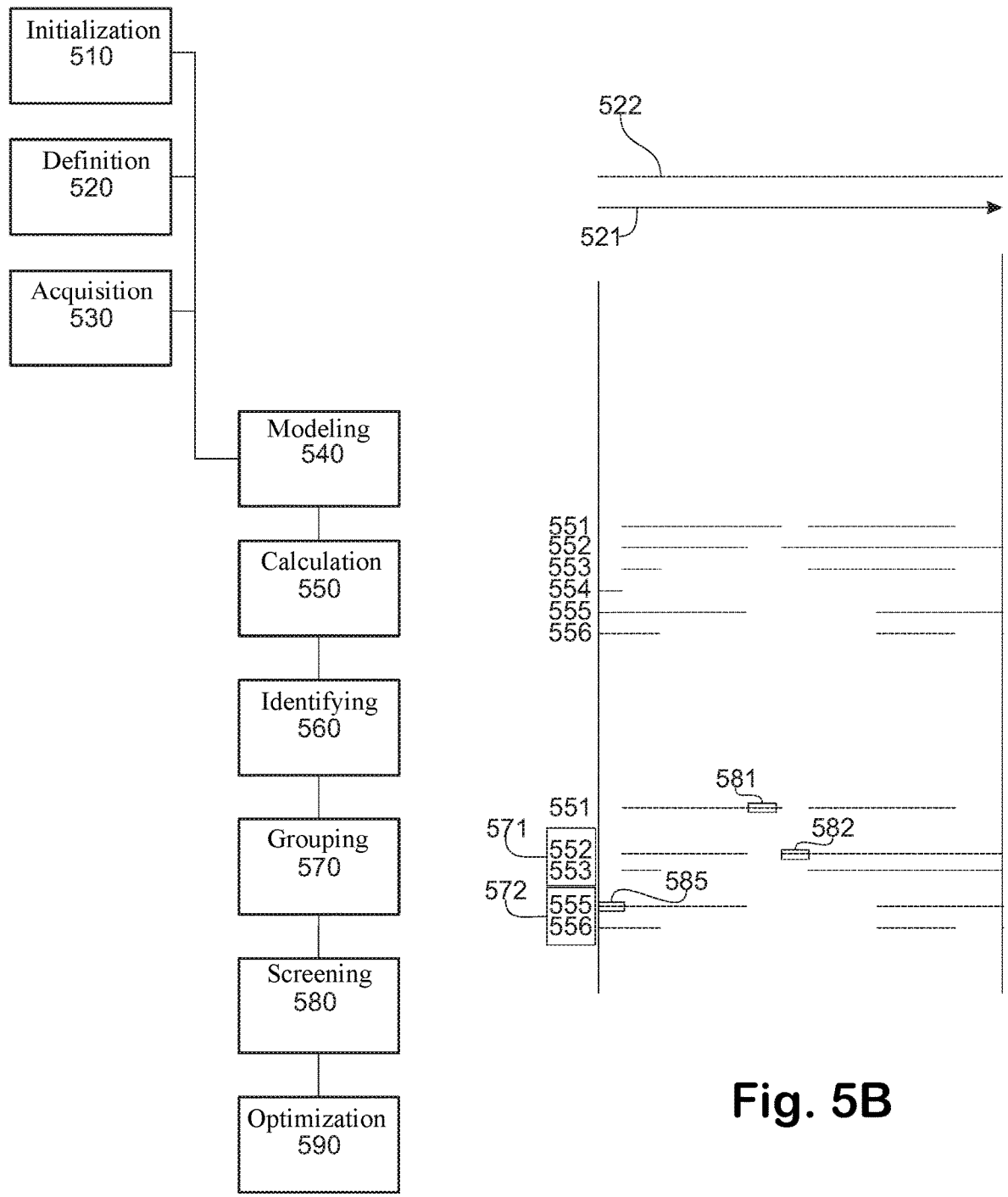

RECONFIGURABLE MOBILE CABLE ROBOT

FIELD OF THE INVENTION

The invention relates to a reconfigurable cable robot and a method of configuration of such a robot.

BACKGROUND OF THE INVENTION

A cable robot is a parallel kinematics robot in which a platform is positioned and moved in space by means of cables pulling the aforementioned platform. Each cable extends between an attachment point and a winch, whether the winch is attached to the platform and the attachment point attached to a fixed structure, or the winch is attached to a fixed structure and the attachment point is fixed to the platform. In many embodiments, the track followed by the cable between the attachment point and the winch comprises at least one pulley, for reorienting the cable, the position in space of the platform being given by the length and direction of the part of the cables extending between the platform and the proximal pulley. As a convention, in the following, each cable is considered to extend between an attachment point connected to the platform, and an anchoring point connected to the supporting structure. The ability to change the length of the cable strand extending between the attachment point and the anchoring point, makes it possible to cover a large working volume with a light and easily installed supporting structure, for example by setting up the anchoring points on poles or on the ceiling of a workshop. The stability of the platform, in a given position, is given by its static equilibrium, which equilibrium is carried out by the tension of the cables which act so as to counteract the external forces to which the aforementioned platform is subjected.

Document GB 2.495.958 describes such a device. Though such a prior art robot has a large potential workspace, a great part of this workspace is actually limited by so called, collision phenomena, this term being taken in a broad sense.

Thus, part of the workspace is not accessible to certain kinematics, because of an interference or collision risk, between the cables themselves. Moreover, when an item lays in the environment of the robot, there is a collision risk between this item and the cables for certain trajectories. Finally, certain parts of the workspace are accessible with various cables configurations, all of which do not exhibit the same stability of the platform. These collision phenomena are generally known in robotics but their resolution is much more complex in the case of a cable robot because, on the one hand, of the greater covered volume, and specifically, because of need for balancing in intensity and orientation the forces applied by the cables to the platform to ensure its stability, each cable having to act on the platform in a direction corresponding to a tension of the cable, which introduces additional constraints. The stability of a particular posture of the platform, is defined by the capacity of the device to resist any force wrench applied to the platform, while each cable remains in a range of permissible elastic deformation.

In the case of a trajectory, the static equilibrium of the platform must be performed in each point making the trajectory, i.e. in a continuous way.

The document "On the Design of Adaptive Cable-Driven Systems", by Rosati and Al, in Journal of Mechanisms and Robotics, Vol 3, May 2011, describes a method for optimizing the position of the mobile anchoring points of a cable robot, but is limited to the case where the anchoring points are contained and move in a plane, and does not take into account the possible collisions with an item contained in the workspace of the robot. The inventors noted that the method recommended in this document cannot be used for the determination of an optimal configuration for a trajectory, in the case of a device comprising a three-dimensional distribution of the anchoring points. Indeed, the method recommended in this document relies on a variational analytical expression of the static equilibrium conditions, which in the case of a force wrench whose components are three-dimensional is not tractable from the point of view of modeling. In addition, from a practical point of view, the principles described in this document cannot be implemented easily, or even cannot be implemented at all, in the case of a three-dimensional distribution of anchoring points. As a matter of fact, the method recommended in this document, consists in determining a configuration of anchoring points adapted to a given situation and then to move the aforementioned anchoring points according to a mode which preserves this configuration, actually consisting in moving the anchoring points on circles A three-dimensional extrapolation of the teachings of this document would consist in considering the displacement of anchoring points on spheres, this kind of implementation being particularly complex and expensive.

OBJECT AND SUMMARY OF THE INVENTION

The invention aims at solving the aforementioned deficiencies and, to this end, relates to a cable robot and an associated configuration method, said cable robot comprising:
- a platform supporting an effector;
- a plurality of cables each connected on one end to an attachment point on the platform and extending from this attachment point to a anchoring point attached to a supporting structure said anchoring points being contained in more than one plane;
- wherein the plurality of cables comprises a set of driving cables whose ends are connected to a winch;
- wherein the plurality of cables comprises a set of reconfigurable cables, whose anchoring points are movable relatively to the supporting structure;
- wherein the supporting structure is beared by a set of independent mobile bases comprising anchorings to fix said mobile bases to the ground.

Thus the cable robot of the invention can be moved to any place in a workshop or a plant and set to an optimal configuration with regard to the task to be performed Advantageously, each mobile bases comprise connections to hook up to another mobile base and move together before spreading the cable robot.

According to an embodiment the cable robot of the invention comprises anchoring points whose displacement relatively to the supporting structure is motorized.

The invention also relates to a method for the determination of the optimal configuration of the cable robot according to any one of the preceding embodiments, in order to carry out a trajectory defined under static equilibrium conditions. In a first embodiment the method of the invention defines an optimal configuration of the reconfigurable set of cable of the robot while the mobile bases are in a fixed position, said method comprising the steps consisting in:
  A. obtaining the material layout of the cable robot;
  B. obtaining the targeted trajectory of the effector, discretized in segments of suitable length;

C. obtaining the external forces wrench applied to the platform in each point of the aforesaid the discretized trajectory;
D. obtaining a discrete set of configurations, known as starting configurations, of the reconfigurable set;
E. analyzing for each starting configuration the ability to reach all the segments of the trajectory defined at step B) under the static equilibrium conditions according to the applied external forces defined at the stage C) and to the material layout obtained at step A), and to eliminate the less promising starting configurations;
F. determining among the remaining configurations of step E) the dominant configurations covering the trajectory and including other configurations;
G. gathering the nondominant configurations according to their coverage by dominant configurations;
H. seeking for the trajectories segments, known as singular segments, covered by only one dominant configuration, and eliminate the configurations comprised in the aforementioned dominant solutions which do not cover the singular segments;
I. determining among the configurations remaining after step H) a minimal combination of configurations covering the whole of the segments obtained at step B);
J. generating a trajectory program integrating the configuration changes determined at the stage I), and transmit the aforementioned program to the control unit of the cable robot in order to carry out the trajectory.

Thus, the method of the invention uses discrete representations of the cable robot and calculates a set of optimal overlapping solutions on this set, thus avoiding the need of determining an analytical formulation of the problem. The sequential sorting and elimination of the initially defined configurations, make it possible to drastically reduce the combinatorics of acceptable configurations for converging towards an optimal set of configurations for a given application.

Advantageously step A) of the method of the invention comprises the steps consisting in:
Ai. obtaining the number of cables of the cable robots;
Aii. obtaining the diameter of the aforesaid cables;
Aiii. obtaining the modulus of elasticity of the aforesaid cables;
Aiv. obtaining the admissible maximum tension in the aforementioned cables;
Av. obtaining the coordinates of the attachment points in a coordinate system linked to the platform.

Thus, the configurations analysis performed at stage E) takes into account, not only geometric criteria, but also the elastic characteristics of the cables.

Advantageously, step B) of the method of the invention comprises the steps consisting in:
Bi. obtaining a succession of points defining a succession of segments corresponding to the trajectory in a reference coordinate system;
Bii. obtaining the platform orientation in each point of the discretized trajectory This preparatory stage makes it possible to define the conditions under which the stability and the collision avoidance are analyzed.

Advantageously, step B) of the method of the invention comprises a step consisting in:
Biii. obtaining the variation limits of the external forces wrench acting on the platform.

This, step E) is carried out by constantly checking the static equilibrium of the platform and, if necessary, by taking account the positioning inaccuracy generated by the elasticity of the cables. The definition of a fixed range of variation of external forces, corresponding to the extreme cases, allows to limit the amount of performed calculations and to simplify these calculations.

According to a particular embodiment of the method of the invention, it comprises, before the step E), a step consisting in:
K. obtaining the position, the shape and the orientation of an obstacle in the workspace of the cable robot.
and step E) comprises a collision test with the aforementioned obstacle.

According to an advantageous embodiment of the method of the invention, it comprises, before step D), a step consisting in:
L. generating automatically a set of starting configurations for step D).

This embodiment takes advantage from the combinatorics reduction provided by the tests and the sequential eliminations of the nonrelevant configurations, for automatically generating a broader set of starting configurations and thus obtaining a widened search field for an optimal sequence of configurations leading to the realization of the concerned task.

Advantageously, the method of the invention comprises after step E), in the case where no promising solution is found, or after step J), in the case where no configurations combination makes it possible to cover the whole trajectory defined at the stage B), the steps consisting in:
M. modifying the position or the orientation of the obstacle in the workspace;
N. replaying the method starting from step E) with the new coordinates of the obstacle.

Thus the method of the invention allows, according to this embodiment, to optimize the placement of the elements of the work scene in the workspace of the cable robot. The person skilled in the art will understand that instead of modifying the position of the obstacle, the method alternatively consists in modifying the position of the mobile bases of the supporting structure.

BRIEF DESCRIPTION OF THE DRAWINGS

The following detailed description, given by way of example, and not intended to limit the claimed invention solely thereto, will best be understood in conjunction with the accompanying drawings in which:

FIG. 5A is a flow chart for determining an optimal position of the anchoring points in accordance with an exemplary embodiment of the claimed invention;

FIG. 5B is a diagrammatic illustration of a trajectory discretized in a plurality of segments in accordance with an exemplary embodiment of the claimed invention.

DETAILED DESCRIPTION OF THE EMBODIMENTS

The invention is exposed hereafter according to its preferred embodiments, by no way restrictive, and in reference on the FIGS. 1 to 6E.

Figure 1:
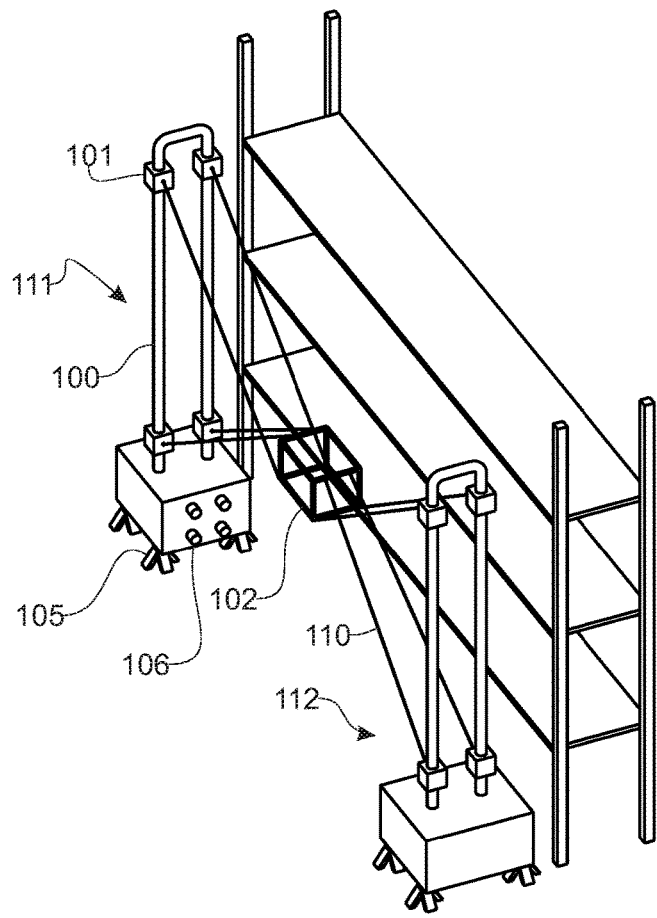
FIG. 1 is a schematic diagram of the cable robot in accordance with an exemplary embodiment of the claimed invention.

FIG. 1 shows an exemplary embodiment of the cable robot according to the invention. The robot comprises a platform (102) suspended by cables (110). Each cable extends between an attachment point connected to the platform (102) and an anchor (101) linked to a supporting structure. According to an exemplary embodiment said anchor (101) is a pulley and the other end of the cable is connected to a winch (not shown) fixed to the supporting structure. The set of cables connected to a winch at one of their ends, is referred to as the driving set of cables.

The supporting structure is made in this example by two mobile bases (111, 112) bearing poles (100) supporting the anchors (101). The relative position of each anchor (101) or part of the anchors may be changed by sliding them on the pole or by rotating them with regard to the pole axes. Said displacements may be carried out manually in predefined positions of continuously by motorizing means. The set of cables running through a repositionable anchoring points is referred to as the reconfigurable site of cables.

Each mobile base (111, 112) comprises anchors (105) that enable to fix the mobile base to the ground thus constituting a stable supporting structure of the cable robot. According to this embodiment one mobile base (111) is an active base comprising motorizing means for moving on the ground. This base also comprises connecting means (106) cooperating with complementary means of the other mobile base (112) to hook up the two bases together. In such a situation, the two bases are hooked up and move together, the active base (111) trailing the other.

Figures 6A, 6B, 6C, 6D, 6E:
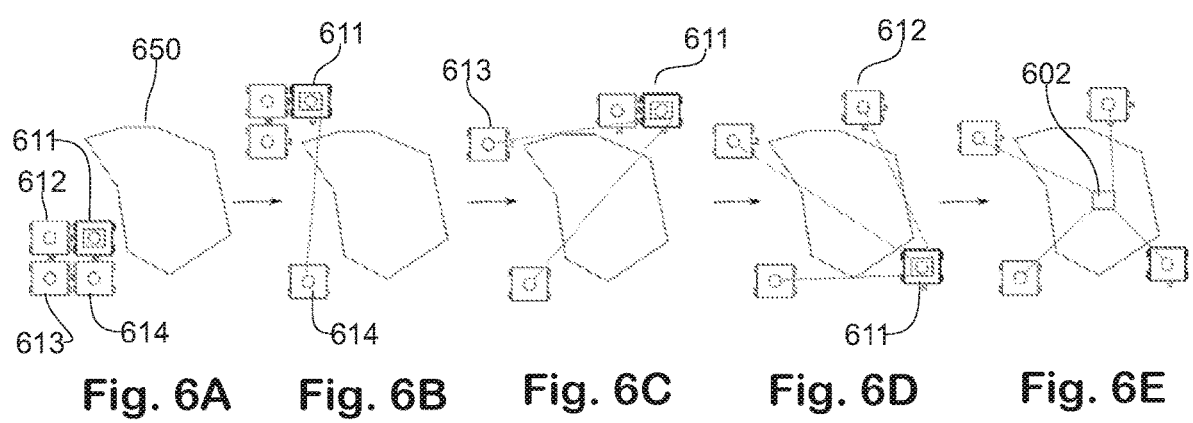
FIGS. 6A-E show diagrams of the cable robot comprising mobile bases in accordance with an exemplary embodiment of the claimed invention.

FIGS. 6A-E show another embodiment of the robot of the invention comprising 4 mobile bases (611, 612, 613, 614), one (611) of them being an active base. In this example the cable robot is spread in order to cover an definite three dimensional workspace (650). Initially, FIG. 6A, the 4 mobile bases are hooked together and move toward the initial position of the 614 base. FIG. 6B, the 614 base is uncoupled form the others and anchored into to the ground. The remaining bases (611, 612, 613) then move toward the position of the 613 base. FIG. 6C the 613 base is uncoupled and anchored to the ground, and the remaining bases (611, 612) move to the position of the 612 base. Once the 612 base is anchored to the ground, the 611 active base moves to its final position, FIG. 6D. During all the preceding steps, the platform remains on the active base (611). FIG. 6E, by operating the winch of the mobile bases (611, 612, 613, 614) the platform (602) is brought into the workspace.

The position of each mobile base (611, 612, 613, 614) with regard to the workspace (650) as well as the position of the anchoring points on the poles of the mobile bases are determined using the method of the invention in order to get an optimal coverage of the workspace (650) with regard to the tasks to be performed by the cable robot. The optimization algorithm is performed by a computer located in one of the bases or by a distant computer, exchanging data with one of the mobile bases through a wireless network.

FIGS. 2A to 5B are illustrating the optimization method according to the invention.

Figure 2A:
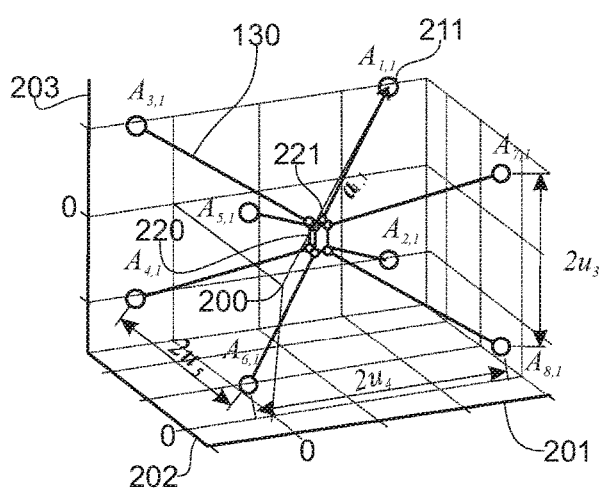
FIGS. 2A-2B show geometric configurations illustrating an optimization method in accordance with an exemplary embodiment of the claimed invention.
Figure 2B:
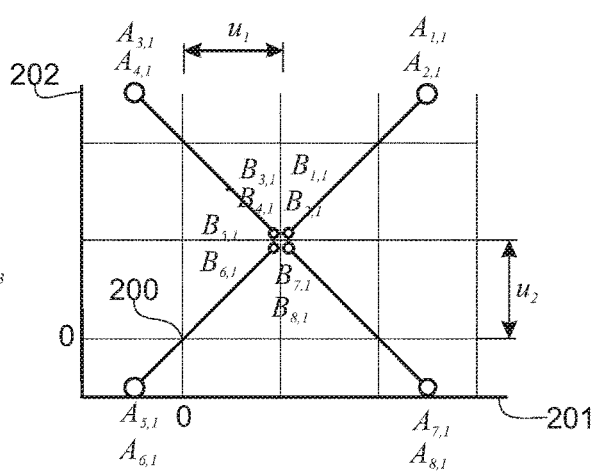

FIGS. 2A-2B, according to a first geometrical configuration, the anchoring points (211) of the cable robot, are placed at the tops of a right-angled parallelepiped, whose sides according to axes' x (201), y (202) and z (203) in the system of coordinate of the robot have respectively as a length $2u_4$, $2u_5$ and $2u_3$, the platform being in the center of the parallelepiped with respective coordinates, $u_1$, $u_2$ and $u_3$. Such a configuration is obtained when all the anchoring points are placed on the tops of the poles of the mobile bases. The position of each anchoring point $A_{i,1}$ which stands for anchoring #1 in the #1 configuration, is determined by an associated vector (213), $a_{i,1}$ extending between the robot origin (200) and the point (211) representing the position of the aforesaid anchoring point. Thus, this #1 configuration, noted $C_1$ is defined by the vectors $a_{i,1}$ (i=1 ... 8), that is to say:

$$a_{1,1}=[u_1+u_4,u_2+u_5,-u_3]^T$$

$$a_{2,1}=[u_1+u_4,u_2+u_5,u_3]^T$$

$$a_{4,1}=[u_1-u_4,u_2+u_5,u_3]^T$$

$$a_{3,1}=[u_1-u_4,u_2+u_5,-u_3]^T$$

$$a_{5,1}=[u_1-u_4,u_2-u_5,-u_3]^T$$

$$a_{6,1}=[u_1-u_4,u_2-u_5,u_3]^T$$

$$a_{7,1}=[u_1+u_4,u_2-u_5,-u_3]^T$$

$$a_{8,1}=[u_1+u_4,u_2-u_5,u_3]^T$$

so that the $C_1$ configuration, according to this embodiment, is defined by the vector $X_1=[u_1, u_2, u_3, u_4, u_5]^T$.

According to this exemplary embodiment, the platform is represented symbolically by a parallelepiped (220), with a section $l_p \times w_p$ in the x, y plane and a $h_p$ height according to z, the attachment points (221) being positioned at the tops of the aforesaid parallelepiped (220). Thus, the coordinates of each attachment point $b_{i,1}$ corresponding to the $C_1$ configuration, are given in a coordinate system linked to the platform by the vectors $b_{i,1}$ that is to say $$b_{1,1}=\tfrac{1}{2}[l_p,w_p,h_p]^T$$

$$b_{2,1}=\tfrac{1}{2}[l_p,w_p,h_p]^T$$

$$b_{3,1}=\tfrac{1}{2}[-l_p,w_p,h_p]^T$$

$$b_{4,1}=\tfrac{1}{2}[-l_p,w_p,-h_p]^T$$

$$b_{5,1}=\tfrac{1}{2}[-l_p,-w_p,h_p]^T$$

$$b_{6,1}=\tfrac{1}{2}[-l_p,-w_p,-h_p]^T$$

$$b_{7,1}=\tfrac{1}{2}[l_p,-w_p,h_p]^T$$

$$b_{8,1}=\tfrac{1}{2}[l_p,-w_p,-h_p]^T$$

Thus, starting from the vectors $b_{i,1}$, of the position of the platform in the machine system of coordinates and the vectors $a_{i,1}$, it is possible to determine the position and the orientation of the cables for all the points of a trajectory carried out in this $C_1$ configuration.

Figure 3:
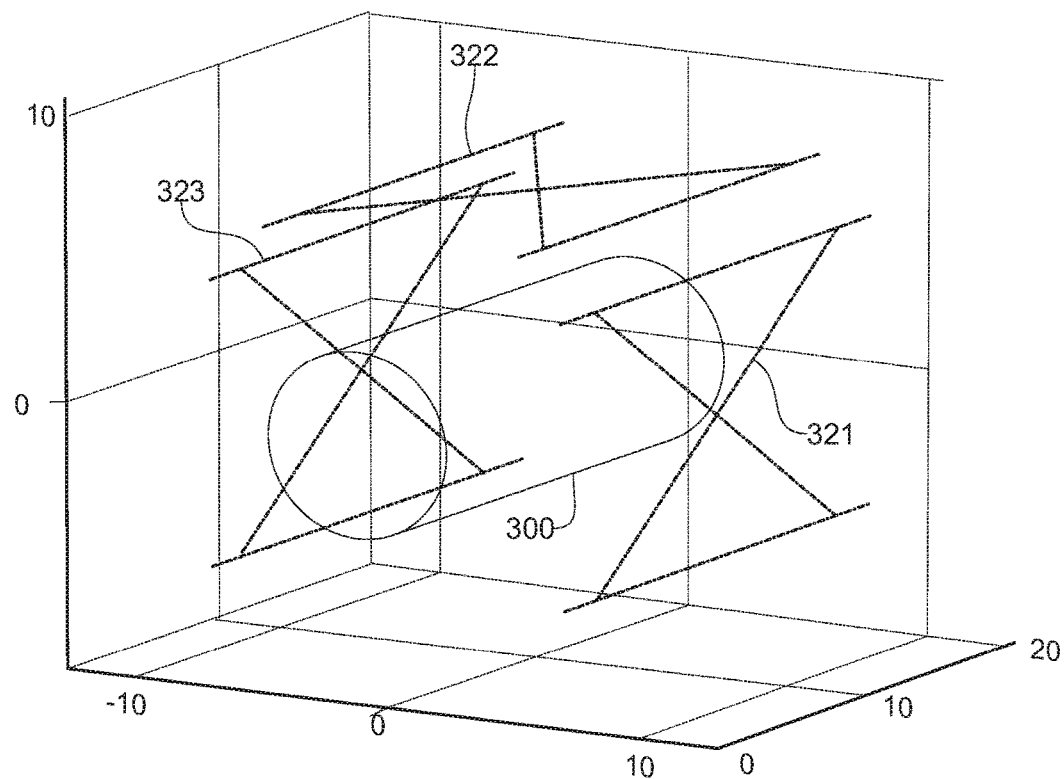
FIG. 3 is an illustration of the cable robot carrying out a painting operation of a large dimension structure in accordance with an exemplary embodiment of the claimed invention.

FIG. 3, according to an exemplary embodiment the robot of the invention is used to carry out an operation of painting of a large dimension structure (300) such as an aircraft fuselage or the hull of a ship. In order to carry out this operation, without collision of the cables with the aforementioned structure (300), at least 3 configurations corresponding to 3 trajectories (321, 322, 323) of the platform are required. Thus, according to this example of implementation, the $C_1$ configuration (FIGS. 2A-B) is adapted for the realization of the $P_1$ trajectory (321). For this application, the top anchoring points ($A_{1,1}$, $A_{3,1}$, $A_{5,1}$, $A_{7,1}$) are set at the top of the poles carried by the mobile bases, and the lower anchoring points ($A_{2,1}$, $A_{4,1}$, $A_{6,1}$, $A_{8,1}$) are set in the lower of part the aforesaid poles.

Performing the $P_2$ trajectory (322) requires a change of configuration.

Figure 4A:
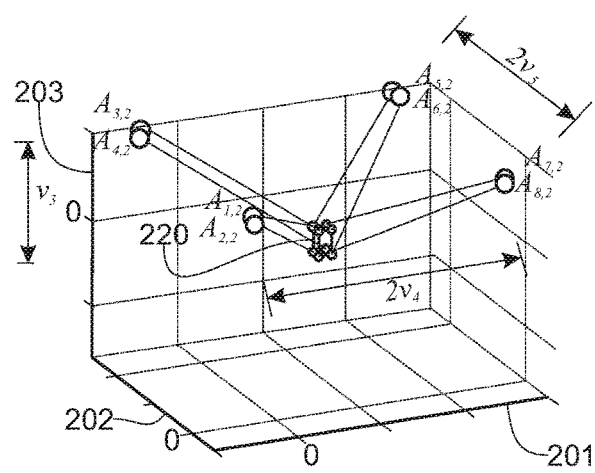
FIGS. 4A-4B show geometric configurations illustrating an optimization method in accordance with an exemplary embodiment of the claimed invention.
Figure 4B:
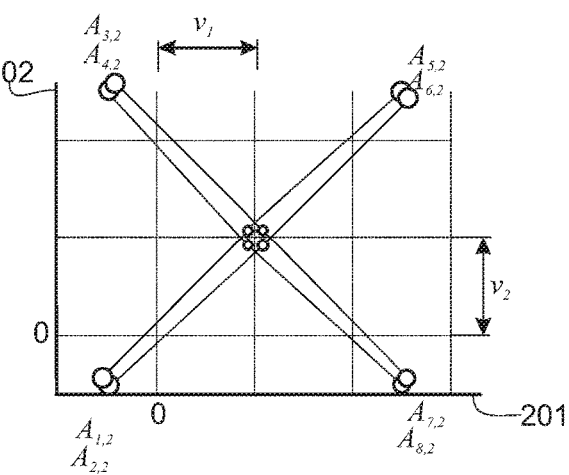

FIGS. 4A-B, the $C_2$ configuration, adapted to the realization of the $P_2$ trajectory is defined by the vector $X_2 = [v_1, v_2, v_3, v_4, v_5]^T$ such as:

$$a_{1,2} = a_{2,2} = [v_1 - v_4, v_2 - v_5, v_3]^T$$

$$a_{3,2} = a_{4,2} = [v_1 - v_4, v_2 + v_5, v_3]^T$$

$$a_{5,2} = a_{6,2} = [v_1 + v_4, v_2 + v_5, v_3]^T$$

$$a_{7,2} = a_{8,2} = [v_1 + v_4, v_2 - v_5, v_3]^T$$

The anchoring points are thus all placed at the tops of the poles.

In this $C_2$ configuration the attachment points of the cables to the platform are also modified so that:

$$b_{1,2} = \frac{1}{2}[l_p, -w_p, h_p]^T$$

$$b_{2,2} = \frac{1}{2}[-l_p, w_p, -h_p]^T$$

$$b_{3,2} = \frac{1}{2}[-l_p, -w_p, h_p]^T$$

$$b_{4,2} = \frac{1}{2}[l_p, w_p, -h_p]^T$$

$$b_{5,2} = \frac{1}{2}[-l_p, w_p, h_p]^T$$

$$b_{6,2} = \frac{1}{2}[l_p, -w_p, -h_p]^T$$

$$b_{7,2} = \frac{1}{2}[l_p, w_p, h_p]^T$$

$$b_{8,2} = \frac{1}{2}[-l_p, -w_p, -h_p]^T$$

Returning to FIG. 3, the (not shown) configuration making it possible to carry out the $P_3$ trajectory (323) is, according to this example of implementation, a configuration similar to the $C_1$ configuration the anchoring points being simply moved on the other side of the structure (300).

The method of the invention allows, among all the configurations offered by cable robot according to the invention, to define an optimal or quasi optimal configuration of anchoring points according to the targeted trajectories to be performed by the platform.

Thus, on FIG. 3, according to an example of implementation of the method of the invention, in order to study the optimal position of the anchoring points for each configuration, the trajectories (321, 322, 323) are discretized in a finished number of segments, for example, according to a G01 linear interpolation of the trajectory according to the ISO 6983 standard. As example, the $P_1$ trajectory is discretized in 38 points, that is to say 37 segments. Each couple of parameters defining the position of an anchoring point according to a configuration, is modified according to a step of iteration between two boundaries. As an example, each couple of parameters $u_i$, $v_i$ is studied according to 9 iterations between definite variation boundaries. The analysis of each situation, i.e. of all the combinations of points of the trajectory and the positions of anchoring points would lead to a combinatorics explosion. Thus, according to this example 59049 ($9^5$) situations would have to be tested in the case of the $C_1$ configuration, for each point of the $P_1$ trajectory leading to more than 2 million possible combinations.

FIG. 5A, the method of the invention aims at reducing the number of studied combinations for determining the optimal position of the anchoring points. A first step (510) of material initialization, consists in obtaining the material layout of the cable robot. As a nonrestrictive example, this step consists in obtaining:

the numbers of cables: m;
the elasticity of the cables, for example by means of their Young's modulus E;
the diameter of the cables $\phi C$;
the stiffness coefficient $K_l$ of each cable l,
the admissible tension $\tau_{max}$ in the cables, so that for each cable l (i=1, ..., m): $0 < \tau_l < \tau_{max}$ which also means that each cable must always be in tension;
the position of the attachment point $B_i$ of the cable in the platform system of coordinates represented for each cable by the vector $b_i$;

These constant material conditions, are gathered in a vector:

$$q = [m, E, \phi c, k_i, \tau_{max}, b_i]^T$$

A step (520) of definition of the trajectory, consists in obtaining the trajectory for which the optimization of the placement of the anchoring points is aimed. As a nonrestrictive example, this step consists in obtaining:

the n points defining the position of the platform in coordinate system of the robot at—the time of the realization of the foreseen P trajectory;
the orientation of the platform in each point of the trajectory, represented for example by means of a rotation matrix R;

Thus, according to an example of implementation, each posture of platform in each point of the P trajectory is determined by a vector $p = [t, \phi]^T$ where the vector t defines the Cartesian coordinates of the platform in the coordinate system of the robot, and the vector $\phi$ the orientation of the platform, determined, for example by the Euler's angle with respect to the axes x, y and z of this system of coordinates.

According to a particular embodiment of the method of the invention, step (520) of definition of the trajectory also comprises the definition of the external forces wrench, $w_e$, applied to the platform in each point of the trajectory. This wrench results from the weights of the platform and of the effector, as well as the forces generated by the aforementioned effector during the task carried out. As a nonrestrictive example, the latter consists in machining forces or in the momentum produced by the ejection a product such as paint through the nozzle of the effector. Thus, in each point of the P trajectory, a vector $w_e = [f, m]^T$ is defined, where the vector f represents the components of the external forces on the axes x, y and z, and the vector m the components of the torque of the external forces on the aforementioned axes. According to an advantageous alternative these external forces are defined by extreme variation boundaries on the various components. This method makes it possible to avoid an exact calculation of the external forces, in particular with regard to the actions generated by the process implemented by the effector, which are not always easy to know with precision and reliability along the trajectory.

According to another advantageous alternative, this step (520) of definition of the trajectory comprises the definition of the shape, the position and the orientation of an obstacle in the workspace of the robot.

FIG. 5B, according to a diagrammatic illustration, the concerned trajectory (521) is discretized in a plurality of segments (522) at the time of performance of step (520) of the definition of the trajectory Returning to the FIG. 5A, the method of the invention comprises a step (530) of acquisition of the starting configurations of the anchoring and attachment points. The definition of these starting configurations is required for the implementation of the method, which proceeds by iterative optimization, and must thus start from an initial configuration. According to alternative embodiments, the whole set of starting configurations corresponds to fixed configurations and materially defined of anchoring points, for example, when the robot allows only discrete positions of anchoring or attachment points. Or, when the position of anchoring points can be changed continuously, the set of starting configurations is automatically generated so as to explore the whole workspace. As an example, the step (530) of acquisition of the starting configurations consists in defining for each anchoring point $A_i$, i=1, . . . , m whose position in the robot system of coordinate is defined by the vector $a_i$, i=1, . . . , m and a set of $n_v$ parameters $u_k$, k=1, . . . , $n_v$, applicable to the coordinates of each vector $a_i$ and a set of discrete values corresponding to a combination of these parameters. These combinations of values are contained in a set $[u_k]$ so that the kth set contains $v_k$ values.

These three steps (510, 520, 530) of acquisition of the initial conditions of the problem are written as follow from an algorithmic point of view:

Require: $q=[m,E,\phi c,k_i,\tau_{max},b_i]^T$
Require: P
Require: R
Require: $w_e$
Require: $[u_k,]$ k=1, . . . , $n_v$ According to an embodiment, the method of the invention comprises a step (540) of modeling of the problem consisting in determining $n_c$ possible configurations of the robot by combining the variables contained in each $[u_k]$set, in the form of $x_l$, l=1, . . . , $n_c$, vectors, each $x_l$ vector defining a $\varepsilon_l$ configuration.

From an algorithmic point of view this step of modeling is written:

Generate $n_c = \Pi_{k=1}^{l_v} v_k, x_l$

According to a calculation step (550) of the reachable points of the trajectory, the method of the invention calculates, for each configuration, which are the reachable points of the P trajectory. A point of the trajectory is reachable for a given $\varepsilon_l$ configuration if this point complies to the constraints, for example:

the static equilibrium of the platform is realized;
the aimed positioning precision is reached;
there is no collision with a potential obstacle in the environment;
there is no interference between the cables.

At the end of this step (550), for each configurations $\varepsilon_l$ and each trajectory it is defined a set of anchoring points $\overline{P}_{p,l}=1$ satisfying the constraints and which are consequently reachable and a of points anchoring points $\overline{P}_{p,l}=0$ for which the conditions are not met and which are consequently reachable in the considered configuration. From an algorithmic point of view this step (550) is written:

```
for l=1, ... ,n_c do
    Compute a_{i,l}, i=1, ... ,m
    for p=1, ... ,n_p do
        function CONSTRAINT(a_{i,l})
```

-continued

```
        Return c_{l,p}
    end function
    If c_{l,p} = 1 then
        P̄_{p,l} =1
    else
        P̄_{p,l} =0
    end if
end for
Compute : [P̄_{p,l}]
```

$$\text{Compute: } h_l = \frac{\sum_{p=1}^{n_p} \overline{P}_{p,l}}{n_p}$$

```
end for
```

For a given $\varepsilon_l$ configuration the reachable points of a given trajectory are given by a set:

$[\overline{P}_{p,l}]=\{\overline{P}_{p,l}=1, p=1,\ldots,n_p\}$

Some reachable points of the trajectory may form disjoined groups. Thus according to an embodiment the method of the invention comprises a step consisting in eliminating the groups of reachable points covering less than a defined part of the trajectory. At the end of this calculation, the configurations which do not cover the trajectory i.e. which does not have any reachable point, or, according to an alternative, of which the proportion of reachable points is lower than a definite proportion are eliminated from the solution.

The proportion of reachable points of the trajectory is given by:

$$h_l = \frac{\sum_{p=1}^{n_p} \overline{P}_{p,l}}{n_p}$$

FIG. 5B, in an illustrative example, the reachable points of the discretized trajectory (522) are calculated for 6 configurations (551, 552, 553, 554, 555, 556). Among these configurations, one of them (554) comprises only a low number of reachable points, and this configuration (554) is eliminated from the solution, as well as any configuration that do not comprise a single reachable point.

Coming back to FIG. 5A, a step (560) of the method of the invention, consists in identifying the dominant configurations among the configurations kept at the end of the preceding step (550).

A dominant configuration is defined as a configuration which is the only one to cover one or many points of the trajectory, i.e. which is the only configuration being able to reach the aforementioned points. Thus, the set of points $[\underline{P}_d]$ pertaining to a dominant configuration d is defined, for a given trajectory by:

$[\underline{P}_d]=\{\overline{P}_{p,d},p=1,\ldots,n_p ou \overline{P}_{p,j}=0,\forall j=1,\ldots,n_d \text{ avec } j\neq d\}$ Thus, the $n_d$ identified dominant configurations correspond to the smallest number of configurations required to cover the P trajectory.

From an algorithmic point of view this step (560) is written:

```
function DOMINANT([P_l])
    - identifying n_d dominant configurations and the corresponding
      [P̄_d]sets
    - identifying the nd sets [P_d]
    return n_d, [P̄_d],[P_d]
end function
```

FIG. 5B, according to this illustrative example, the remaining configurations (551, 552, 553, 555, 556) comprise 3 dominant configurations (551, 552, 555).

FIG. 5A, the step (560) of determination of the dominant configurations is followed by a grouping step (570), consisting in gathering under the same dominant configuration the configurations covered by the aforementioned dominant configuration. This grouping step makes it possible to identify for each $n_d$ dominant configurations a $G_d$ set such as:

$$\varepsilon_l \in G_d \text{ si pour } l = 1, \ldots, n_c \begin{cases} [\overline{P}_l] \in [\overline{P}_d] \\ [P_d] \in [P_l] \end{cases}$$

Which from an algorithmic point of view translates in:

```
for l=1, ... ,n_c do
    for d=1, ... ,n_d do
        if[P̄_l]∈[P̄_d] then
            if [P_d]∈[P_l]then
                l←l+1
                ε_l ∈G_d
            end if
        end if
    end for
end for
```

FIG. 5B, according to an illustrative example, the configurations are gathered according to two groups (571, 572) each one comprising two configurations including one dominant, and a single dominant configuration (551).

FIG. 5A, according to a screening step (580), aiming at eliminating the redundant configurations, the aforementioned step (580) consists in seeking the singular segments of each dominant configuration. A singular segment is a set of points of the trajectory which are covered by only one dominant configuration.

FIG. 5B, as an illustrative example, each dominant configuration (551, 552, 555) comprises a singular segment (581, 582, 585). One of the configurations (553) grouped with one of the dominant configurations (552) does not cover the singular segment (582) of this dominant configuration. Therefore, this configuration (553) is eliminated from the solution.

This iterative step makes it possible to limit the optimization process to the study of the relevant configurations.

FIG. 5A, during an optimization step (590), the optimization is led on all the possible combinations of the kept configurations each configuration group $G_d$. Advantageously, the combinations of configurations which do not make it possible to reach all the points of the trajectory are not considered in this analysis.

FIG. 5B, as an illustrative example, no combination implementing one or more dominant configurations (551, 552) of the first groups (551, 571) with the nondominant configuration (556) of the third group (572) makes it possible to reach all the points of the trajectory, so that this configuration (556) and its combinations with other configurations are ignored. In practice, according to this illustrative example, only the combination of the 3 dominant configurations makes it possible to cover all the trajectory. The optimization is carried out according to defined optimization criteria, by means of known techniques of optimization of the prior art, the optimization criteria being defined according to the application and make it possible to define the optimal sequence of configurations out of the singular segments.

In the case where a complete optimal solution cannot be obtained, several actions are possible depending on the application, like:
   to define a new set of starting configurations, with respect to anchoring or attachment points;
   loosening the optimization constraints, for example by accepting a lower precision and/or a higher deformations of the cables;
   modifying the position of the obstacles in the workspace of the robot, e.g. by changing the foreseen position of the supporting bases.

Various omissions, modifications, substitutions and changes in the forms and details of the device illustrated and in its operation can be made by those skilled in the art without departing in any way from the spirit of the present invention. Accordingly, the scope of the invention is not limited to the foregoing specification, but instead is given by the appended claims along with their full range of equivalents.

The invention claimed is:

1. A method for defining an optimal configuration of a reconfigurable set of cable of a cable robot, said method comprising steps of:
   obtaining a material layout of the cable robot, the cable robot comprising:
      a platform supporting an effector;
      a plurality of cables, each connected on one end to an attachment point on the platform and extending from this attachment point to an anchoring point attached to a supporting structure, said anchoring points being contained in more than one plane;
      wherein the plurality of cables comprises a set of driving cables whose ends are connected to a winch;
      wherein the plurality of cables comprises a set of reconfigurable cables, whose anchoring points are movable relative to the supporting structure;
      wherein the supporting structure is beared by a set of independent mobile bases comprising anchorings to fix said mobile bases to the ground;
   obtaining a targeted trajectory of the effector, discretized in segments of suitable length;
   obtaining external forces wrench applied to the platform in each point of the aforesaid the discretized trajectory;
   obtaining a discrete set of starting configurations, of the reconfigurable set;
   analyzing, for each starting configuration, an ability to reach all the segments of the targeted trajectory under static equilibrium conditions according to the applied external forces and to the obtained material layout, and to eliminate the less promising starting configurations;
   determining among remaining configurations, dominant configurations covering the targeted trajectory and including other configurations;
   gathering nondominant configurations according to their coverage by dominant configurations;
   seeking for singular segments covered by only one dominant configuration, and eliminate configurations comprised in the dominant solutions which do not cover the singular segments;

determining among the configurations remaining after seeking singular segments, a minimal combination of configurations covering the whole of the segments obtained at the targeted trajectory obtaining step;

generating a trajectory program integrating configuration changes determined at the step of determining the minimal combination of configurations, and transmitting the trajectory program to a control unit of the cable robot in order to carry out the trajectory.

2. The method according to claim 1, wherein the step of obtaining the material layout further comprises steps of:
   obtaining a number of cables of the cable robots;
   obtaining a diameter of the cables;
   obtaining a modulus of elasticity of the cables;
   obtaining an admissible maximum tension in the cables;
   obtaining coordinates of the attachment points in a coordinate system linked to the platform.

3. The method according to claim 1, wherein step of obtaining the targeted trajectory comprises steps of:
   obtaining a succession of points defining a succession of segments corresponding to the trajectory in a reference coordinate system; and
   obtaining the platform orientation in each point of the discretized trajectory.

4. The method according to claim 3, wherein step of obtaining the targeted trajectory further comprises a step of obtaining the variation limits of the external forces wrench acting on the platform.

5. The method according to claim 1, further comprising, before the analyzing step, a step of obtaining a position, a shape and an orientation of an obstacle in the workspace of the cable robot; and wherein the analyzing step further comprises performing a collision test with the obstacle.

6. The method according to claim 1, further comprising, before the step of obtaining the discrete set of the starting configurations, a step of generating automatically a set of starting configurations for the step of obtaining the discrete set of the starting configurations.

7. The method according to claim 5, further comprising, after the analyzing step, in the case where no promising solution is found, or after the step of determining the minimal combination of configurations, in the case where no configurations combination covers the whole targeted trajectory, steps of modifying the position or the orientation of the obstacle in the workspace; and repeating the method starting from the analyzing step with new coordinates of the obstacle.

* * * * *